United States Patent
Knorr (10) Patent No.: US 11,894,730 B2
(45) Date of Patent: Feb. 6, 2024

(54) ELECTRIC MOTOR, FAN, AND SYSTEM INCLUDING AN ELECTRIC MOTOR AND AN EVALUATION UNIT

(71) Applicant: ZIEHL-ABEGG SE, Künzelsau (DE)

(72) Inventor: Joachim Knorr, Niederstetten (DE)

(73) Assignee: ZIEHL-ABEGG SE, Künzelsau (DE)

(*) Notice: Subject to any disclaimer, the term of this patent is extended or adjusted under 35 U.S.C. 154(b) by 555 days.

(21) Appl. No.: 17/261,256

(22) PCT Filed: Jun. 4, 2019

(86) PCT No.: PCT/DE2019/200058
§ 371 (c)(1),
(2) Date: Jan. 19, 2021

(87) PCT Pub. No.: WO2020/015797
PCT Pub. Date: Jan. 23, 2020

(65) Prior Publication Data
US 2021/0273527 A1    Sep. 2, 2021

(30) Foreign Application Priority Data

Jul. 17, 2018 (DE) .......................... 102018211848.5

(51) Int. Cl.
*H02K 11/20* (2016.01)
*H02K 11/33* (2016.01)
(Continued)

(52) U.S. Cl.
CPC ........... *H02K 11/20* (2016.01); *H02K 5/1732* (2013.01); *H02K 7/14* (2013.01); *H02K 11/33* (2016.01); *H02K 2211/03* (2013.01)

(58) Field of Classification Search
CPC .... H02K 5/1732; H02K 5/1735; H02K 11/35; H02K 7/083; H02K 7/085; H02K 2211/03; H02K 2213/03
See application file for complete search history.

(56) References Cited

U.S. PATENT DOCUMENTS

| 9,605,996 B2* | 3/2017 | Kessler | ................... G01H 9/00 |
| 2009/0114020 A1* | 5/2009 | Yanohara | ............ G01M 13/045 73/593 |

(Continued)

FOREIGN PATENT DOCUMENTS

| CN | 202614529 U | 12/2012 |
| DE | 102008053875 | 5/2009 |

(Continued)

OTHER PUBLICATIONS

Lee et al., "Acoustic resonance of outer-rotor brushless dc motor for air-conditioner fan", Journal of Applied Physics, vol. 103, 2008, Article-No. 07F116 (3 S.).—ISSN 0021-8979.

*Primary Examiner* — Tran N Nguyen
*Assistant Examiner* — Masoud Vaziri
(74) *Attorney, Agent, or Firm* — FisherBroyles, LLP; Jason P. Mueller (57) ABSTRACT

An electric motor includes at least one bearing and a rotatably-mounted axle. During operation, generated sound can be detected by a sound sensor. A sound chamber is formed in the electric motor, and is delimited by several boundary surfaces. At least one of the boundary surfaces may include an acoustic surface that is formed by a surface of the bearing or by a surface of a body conducting sound. The sound sensor is arranged in the sound chamber to detect sound transmitted from the acoustic surface to the sound sensor. The motor may be part of a fan and/or a system having an evaluation unit. In the former case, an impeller is provided, which is connected to a rotor of the electric motor. In the second case, the evaluation unit has a communication interface via which readings of a sound sensor and/or processed readings from sensor electronics may be received.

15 Claims, 4 Drawing Sheets

(51) Int. Cl.
*H02K 5/173* (2006.01)
*H02K 7/14* (2006.01)

(56) References Cited

U.S. PATENT DOCUMENTS

| | | | | |
|---|---|---|---|---|
| 2015/0163589 A1* | 6/2015 | Haddad | ................... | H02K 1/34 |
| | | | | 381/369 |
| 2017/0307689 A1* | 10/2017 | Muramatsu | .......... | G01R 31/343 |
| 2018/0115226 A1* | 4/2018 | Zhang | ............... | H02K 15/0006 |

FOREIGN PATENT DOCUMENTS

| | | |
|---|---|---|
| DE | 102012220222 | 5/2014 |
| DE | 102013102648 | 9/2014 |
| DE | 102018211833 | 1/2020 |
| EP | 2972431 | 1/2016 |
| JP | 2013047690 A | 3/2013 |
| JP | 2013134060 A | 7/2013 |
| RU | 2563597 C2 | 9/2015 |
| WO | 2011069545 A1 | 6/2011 |

* cited by examiner

ELECTRIC MOTOR, FAN, AND SYSTEM INCLUDING AN ELECTRIC MOTOR AND AN EVALUATION UNIT

This application is a national stage entry under 35 U.S.C. 371 of PCT Patent Application No. PCT/DE2019/200058, filed Jun. 4, 2019, which claims priority to German Patent Application No. 10 2018 211 848.5, filed Jul. 17, 2018, the entire contents of each of which are incorporated herein by reference.

The disclosure relates to an electric motor having at least one bearing, to which a shaft or an axle of the electric motor is rotatably mounted, wherein sound is generated during operation of the electric motor, which sound is detectable by a sound sensor. The disclosure, furthermore, relates to a fan with an electric motor and a system including an electric motor and an evaluation unit.

Electric motors typically include a stator and a rotor, which is rotatably mounted relative to the stator. The motor axle or shaft is often supported by one or more bearings. These bearings are usually designed as roller bearings including an outer ring, an inner ring, and several rolling elements arranged between the inner and the outer rings. The rolling elements allow the inner ring to rotate smoothly relative to the outer ring, and ensure that the bearing operates largely free of play. In many cases, the rolling elements are spherical or cylindrical, and are held in position by a cage. In this case, the rolling elements between the outer ring and inner ring are lubricated by a lubricant, usually oil or bearing grease.

Like many mechanically moving devices, bearings are subject to wear. This can be caused or promoted by chipped particles, insufficient lubrication, defective bearing cages, penetrating foreign particles, scoring, uneven loading (e.g., due to distortion), strong vibration stress, or the like, and may lead to bearing damage. Depending on its progress, wear usually manifests itself in the form of mechanical vibrations, which are transmitted via the bearing shells to other electric motor components. These vibrations can be measured with vibration sensors, especially in the case of severe damage. Mostly vibration sensors are used, which measure the acceleration or speed of the vibrations.

Such a system is disclosed, e.g., in EP 2 972 431 B1. For this purpose, a vibration sensor is attached to the stator flange on its side facing away from the rotor by a metallic structure-borne sound element. The vibration sensor measures vibrations of the electric motor, allowing problems with the bearing of the electric motor to be detected.

In the case of low wear, or the presence of distortions in the bearings, it would nevertheless be beneficial if the condition of the bearings could be determined, since this would make it possible to react to critical operating conditions at an early stage. However, the resulting mechanical vibrations are so low that they can only be measured with very high-quality vibration sensors, which are unsuitable for large-scale production, due to the amount of costs involved. However, inexpensive vibration sensors are usually limited in terms of bandwidth, and can only measure at a limited frequency with good quality and resolution. Typical low-cost MEMS (micro-electro-mechanical system) accelerometers are able to, e.g., measure signal frequencies of no more than 5 kHz at 8-bit resolution. If a higher resolution, for example 10 or 12 bits, is required, the sampling rates drop swiftly to 2 kHz, or below. However, these frequencies are unsuitable for detecting incipient bearing damage.

Thus, in some devices a microphone is used in addition to a vibration sensor. This type of device for monitoring the condition of a rolling bearing is disclosed, for example, in DE 10 2012 220 222 A1. In addition to a vibration sensor, a sound emission sensor is employed to measure sound emissions from the bearing in the ultrasonic range. The signal from the vibration sensor is used to divide the condition of the bearing into one of four categories based on limit values. The measured sound emissions are used to adjust the limit values. However, the utilized ultrasonic microphones are expensive. Moreover, this system still requires a high-quality vibration sensor.

DE 10 2008 053 875 A1 discloses a bearing-condition diagnostic device, wherein bearing noises are recorded by noise sensors and compared with previously recorded data. To improve the signal-to-noise ratio, noise-conduction channels are formed within the electric motor in order to conduct sound from the bearing to the noise sensor. A switching device may connect one of several noise-conduction channels to a noise sensor. Although this allows for effective measurement of noise generated by bearings, the production of the required noise-conduction channels is complex and therefore expensive.

Hence, the present disclosure is based on the object of designing and developing an electric motor, a fan, and a system of the aforementioned type, such that sound generated during operation of the electric motor can be evaluated using simple and inexpensive techniques.

Thus, the electric motor may be characterized by a sound chamber, which is formed in the electric motor and delimited by several bounding surfaces, wherein at least one of the bounding surfaces includes an acoustic surface, wherein the acoustic surface is formed by a bearing surface or a surface of a body conducting sound to this surface, wherein the sound sensor is arranged in the sound chamber, and wherein the sound sensor is designed to detect sound transmitted through air from the acoustic surface to the sound sensor.

According to some embodiments, the fan according to the present disclosure includes an electric motor and an impeller, wherein the impeller is connected to a rotor of the electric motor.

According to further embodiments, the system according to the present disclosure includes an electric motor, and an evaluation unit, wherein the evaluation unit has a communication interface, via which readings from a sound sensor and/or processed readings can be received by sensor electronics for the evaluation unit, and wherein the evaluation unit is configured to evaluate the readings and/or the processed readings.

Applicant has recognized that bearing damage or incipient bearing damage often manifests itself as clearly audible noise in the 3-5 kHz range. Even bearing distortions give rise to noises in said frequency range. Other sound sources, such as air flow, imbalances, loads connected to the rotor of the electric motor rotor, or ventilation screens, may also produce sound in this frequency range during electric motor operation. These frequencies cannot be detected with sufficient resolution and quality using inexpensive vibration sensors. However, inexpensive sound sensors can fill this gap, and thereby supplement or even replace the use of a vibration sensor.

Since the amplitudes of the sound waves are often relatively small, in order to improve detectability, a sound chamber is formed in the electric motor at the sound sensor, which sound chamber is delimited by several boundary surfaces. This sound chamber acts as a kind of resonance volume, which promotes the propagation of sound waves through the air and improves measurements with a sound sensor. At least one of the boundary surfaces of the sound chamber is formed by an acoustic surface. Such an acoustic surface can be formed by various surfaces, which transmit sound from the sound source, for example, a bearing of the electric motor to the sound chamber. In one embodiment, such an acoustic surface is formed by a bearing surface. This surface may, for example, be an end face of the bearing, or a part of the inner and/or outer ring. In another embodiment, such an acoustic surface is formed by a surface of a sound-conducting body, which conducts sound to its surface. In the case of a bearing acting as a sound source, the sound-conducting body would conduct sound away from the bearing to its surface. In principle, both embodiments may also be combined.

If such an acoustic surface delimits the sound chamber on at least one side, the structure-borne sound can be emitted from the acoustic surface to the air in the sound chamber. A sound sensor located in the sound chamber can therefore measure the sound emitted by the bearing or another sound source. The provision of a sound chamber allows for an inexpensive sound sensor to be used, despite the relatively small amplitudes, such that a device for detecting bearing damage or incipient bearing damage can be created in a simple manner.

It should be noted that the teaching described herein is not restricted to the use of a single sound sensor. Rather, multiple sound sensors may be used to measure sound at different locations of the electric motor. It is conceivable that the several sound sensors are arranged at different locations in the sound chamber. For example, in a sound chamber with several acoustic surfaces, a separate sound sensor may be arranged at each or some of the acoustic surfaces.

The term "operation of the electric motor," during which sound is generated and coupled into at least parts of the electric motor refers to a rotational movement of the rotor of the electric motor relative to the stator of the electric motor. In terms of the bearing, this operation may generate a rotational movement of the inner ring relative to the outer ring. The speed of the rotary movement is largely irrelevant, as even minute movements will produce operating noise. In certain embodiments, however, operation of the electric motor is understood to be operation as intended, i.e., the operating noises of the bearing or other operating noises are detected and evaluated during normal electric motor use. Obviously, this does not preclude the recording and evaluation of bearing operating noises during commissioning or a calibration run to determine, whether the bearings have any distortion, and whether the bearings are working properly.

In principle, the sound chamber may have a wide variety of shapes. Cylindrical, cuboid, or prismatic shapes (for example, with a hexagonal or octagonal base) are referred to by way of example only, not by way of limitation. The boundary surfaces of the sound chamber may be smooth or structured. What is important is only that the acoustic surface is able to emit the sound properly to the sound chamber and that the sound can propagate properly within the sound chamber. However, such a requirement can relatively easily be created.

In some embodiments, the acoustic surface may be made of a metal. The transmission and the delivery of the sound to the sound chamber is aided, for example, when the acoustic surface is formed by a surface of a sound-conducting body.

The electric motor can also have a wide variety of designs. Electric motors with an internal rotor design may also be equipped with a sound chamber, as can electric motors with an external rotor design. Accordingly, several motor types can be used. The use of a synchronous motor, an asynchronous motor, or an EC motor (electronically commutated motor) is referred to merely by way of example.

A wear-monitoring unit may be provided in order to evaluate the condition of the bearing(s). Such a wear-monitoring unit may be part of sensor electronics or motor electronics, or can be designed as a separate functional unit. The unit may be integrated in the electric motor, or implemented in an external unit. Such a wear-monitoring unit is intended to extract characteristic values from the measurement signals of the sound sensor and display the condition of the bearing(s). In one embodiment, the measurement signal may be viewed in a frequency band, for example, 3 kHz to 5 kHz, and the amplitudes of the measurement signal may be evaluated. This may include, for example, detecting the maximum amplitude or a mean amplitude in this frequency band. From the evaluation of the amplitude, the bearing condition can then be inferred. In another embodiment, a spectral analysis of the measurement signal may be done, for example using a FFT (Fast Fourier Transform). The extent and sometimes even the type of wear can then be determined based on the spectrum or, generally, the analysis result.

As explained above, the electric motor may, in principle, be designed to detect and evaluate a wide variety of noises generated during operation. Only by way of example, reference is made to vibrations caused by the imbalances, vibrations of a ventilation screen, noises caused by air flow, for example, while using the electric motor in a fan, or due to vibrations of a load connected to the electric motor rotor. As long as the sound produced is transmitted to one of the acoustic surfaces of the sound chamber, this sound can be detected and appropriately evaluated. However, the electric motor is used to detect noise from the at least one bearing of the electric motor. In this case, the sound generated during operation of the electric motor includes sound emitted by the at least one electric motor bearing. In this regard, it may be advantageous if other noises not resulting from the operation of the at least one bearing are attenuated by suitable design measures.

In a further development, the sound chamber may be formed between a circuit board and a stator bushing of the electric motor. The stator bushing is usually referred to as the area of the electric motor, which supports the stator winding assembly of the electric motor. In the case of external rotor motors, it is customary to provide an electronics housing, in which a circuit board may be arranged on the side of the stator bushing facing away from the stator winding assembly. Various circuits may be formed on such a circuit board, including, for example, sensor electronics, power switches, or components for controlling electric motor functions. However, in an example embodiment, the circuit board carries motor electronics, which are designed to drive the stator windings and/or the electric motor rotor.

In this development of the sound chamber between the circuit board and the stator bushing, the acoustic surface is formed by a stator-bushing surface. This surface will usually be the surface of the stator bushing facing the circuit board. In directions parallel to the circuit board, the sound chamber may be bounded by lateral walls of an electronics enclosure. In a further example embodiment, however, a limiting element is arranged between the circuit board and the stator bushing, which delimits the sound chamber in directions parallel to the circuit board. Such a limiting element may be formed from a wide variety of materials. In certain embodiments, however, the limiting element is a plastic component arranged between the circuit board and the stator bushing. The limiting element may have different base areas. By way of example only, not limitation, reference may be made to a square, round, elliptical, rectangular, hexagonal, or octagonal base.

In principle, the sound sensor may be arranged in various ways in this development of the sound chamber. In some embodiments, however, the sound sensor is arranged on the circuit board, which delimits the sound chamber in one direction. In this case, the sound sensor may be arranged on the side of the circuit board facing the stator bushing. Thus, simple installation, as well as useful measurability of the sound waves can be achieved.

In another development, the sound chamber may be formed in a bearing tube, which encloses at least parts of the shaft or axle of the electric motor, and whereon at least one bearing mounting area for the bearing(s) is formed. In such an embodiment, the sound chamber would be delimited by the walls of the bearing tube, the bearing(s), and the shaft/axle. In the case of an external rotor motor, bearing mounting areas are usually formed on either side of the bearing tube, wherein a bearing is mounted. Between the shaft and the bearing tube, a 4-8 mm gap is often formed. This creates a space, which may be used as a sound chamber in the context of the present disclosure. Almost all boundary surfaces of the sound chamber may serve as acoustic surfaces. On the one hand, the surfaces of the bearings facing the sound chamber can emit sound waves to the sound chamber, and thus form acoustic surfaces. On the other, the shaft/axle and the walls of the bearing tube are in direct contact with the bearings. Since both the shaft/axle and the walls of the bearing tube are usually made of metallic materials, they are efficient for transmitting the sound waves generated by the bearing into the interior of the sound chamber.

In this development, the sound sensor may be part of a sensor arrangement designed to be inserted into the bearing tube. Such a sensor arrangement is described in more detail in DE 10 2018 211 833 A1, the content of which is hereby explicitly referred to.

To improve the results of detecting the sound generated by the bearings, the sound sensor may be arranged adjacent to the acoustic surface. "Adjacent to" here means that the distance between the acoustic surface and the sound sensor is less than 5 cm. In one example, the sound sensor is less than 1 cm away from the acoustic surface. This can also mean that the sound sensor is located at the smallest possible distance from the acoustic surface. If there are several acoustic surfaces, the sound sensor can also only be arranged close to one of the several acoustic surfaces, while the other acoustic surfaces are located at a greater distance. Here, the distance refers to the distance by which the acoustic surface is spaced apart from the active area of the sound sensor.

In principle, the sound sensor can be designed in a wide variety of ways. Key should be that the sound sensor is sufficiently robust in order to be used in the relevant application scenario. Moreover, the sound sensor will need to be sufficiently temperature resistant and robust against electromagnetic waves, especially when used inside the bearing tube. What's more, the sound sensor should be designed to measure sound waves in the audible range, i.e., between about 20 Hz to 20 kHz [sic]. A sound sensor that can detect frequencies between 1 kHz and 10 kHz may be used. For instance, the sound sensor may be sensitive in the 3-5 kHz range. However, a variety of sound sensors may meet these expectations.

In an example embodiment, the sound sensor is formed by a MEMS (micro-electro-mechanical system). In some embodiments, the sound sensor is a MEMS microphone. Such MEMS microphones having very compact dimensions are available on the market. Infineon, for example, sells MEMS microphones that are only 3×4×1.2 mm in size. MEMS microphones with similar dimensions are also available from other manufacturers. The measuring ranges start in the two-digit Hertz range and extend up to 20 kHz. Such MEMS microphones are ideally suited for the electric motor.

A further development provides electronics, which are designed to drive the sound sensor. The specific design of the sensor electronics depends on the sound sensor being used. Typically, the sensor electronics are likely to have a wide variety of electrical and electronic components. Likewise, discrete components may be used as integrated components. By way of example only, i.e., not limitation, reference is made to the use of integrated circuits, resistors, coils, capacitors, plug connections, and/or transistors. In some embodiments, components which are designed as SMD components are used.

In order to obtain a complete as possible picture of the bearing condition, the sensor electronics can be configured to repeatedly generate readings, and evaluate the bearing condition. This repeated generation of readings and repeated evaluation of the state can be triggered by certain events. It is conceivable, for example, that an evaluation during a run-up test is triggered during a final test of the electric motor. It is also conceivable that an evaluation is performed in connection with switching on the electric motor, for example, 10 seconds after switch-on. However, such an event may also include maintenance work, in which a maintenance person makes a connection to the sensor electronics via an interface and triggers the acquisition of readings.

In some embodiments, repeated generation of readings and repeated evaluation of the condition are performed periodically. Since the condition of a bearing will usually change relatively slowly, it will often redundant to evaluate the condition of bearings every second or minute. Instead, it will usually suffice if the period length is in the hour range, or even in the day range.

In one embodiment, the sensor electronics has a processor that can perform various tasks. The processor may be designed as a micro-controller. The processor can process and/or evaluate readings from the sound sensor. Such processing/evaluation can be done in a wide variety of ways. Conceivably, an analog/digital conversion could be performed, such that a measurement signal from the sound sensor is available as a sequence of digitized measurement values. Processing may include linearization of the measurement signal from the sound sensor. It is also conceivable that filtering is carried out in relation to certain frequencies. Processing may also mean a spectral analysis of the measurement signal, for example, by performing a Fourier transformation of the measurement signal. The processing of readings can be a first step in evaluating these. If, for example, the measurement signal is evaluated by amplitude weighting, then frequency filtering of the measurement signal should be carried out in a first step, and only then followed by amplitude weighting. In the case of frequency weighting, a spectral analysis might be an appropriate option in advance.

The sensor electronics may have a memory, in which readings of the sound sensor and/or processed readings and/or results of an evaluation of readings can be stored. The memory may be configured in a wide variety of ways. To avoid data loss in the event of a power supply outage, the memory may be a non-volatile memory. Such a non-volatile memory may be, for example, a flash memory, EEPROM (Electronically Erasable Programmable Read-Only Memory), NVRAM (Non-volatile Random Access Memory), or other semiconductor memory.

The size of the memory will depend on various factors. Thus, if a large number of readings is to be stored, a larger memory will be needed, than if only a few readings are to be stored. If the stored readings include raw data, which will later be subjected to a frequency analysis, more memory will be needed. In addition, the frequency with which readings are recorded will have an effect, in that with hourly recording of readings, significantly more readings will be generated than with daily or weekly recording.

In a n exemplary development, the sensor electronics may include a real time clock (RTC). This real-time clock can be used for various time-controlled and/or time-based processes within the sensor electronics. If, for example, the measurement and evaluation of the noise of the bearings is to be triggered hourly or daily by the sensor electronics, the real-time clock can trigger this process. In one embodiment, the real-time clock is used to time-stamp an acquired reading or a set of readings. When a reading is stored, a ti me stamp would also be stored, which is representative of the instance, when the stored reading was generated.

In order for the readings, processed readings, and/or the results of reading evaluations to be used also outside the sensor arrangement, the sensor electronics may have a communication interface. The communication interface can be used to couple the sensor electronics with a readout device. Thus, information can also be acquired, while the engine is running. Moreover, coupling to an IoT (Internet of Things) gateway is an option. This communication interface may be wired or wireless. Optical communication means using an air-link, or alternatively, an optical fiber could be used. It is useful if the communication interface allows access to readings which are stored in memory. This memory may be formed using the aforesaid non-volatile memory. However, readings may also be output from the operating memory of a processor, for example, RAM (Random Access Memory), or a cache.

The communication interface may be designed in a wide variety of ways. Wireless transmission methods, for example radio-based or optical methods, may be used just, as may be cable-based methods. The transmission may be analog or digital, serial or parallel, packetized, or da ta-streamed, via a bus, or direct connections. The transmission technology used in each case will depend on the specific application scenario. For example, but not limited thereto, Bluetooth, Bluetooth LE (Low Energy), NFC (Near Field Communication), Ethernet, RS485, Modbus, Profibus, CAN bus, or USB (Universal Serial Bus) are all available options. By way of example, the communication interface may provide, directly or indirectly, access to a wide-area network.

Using such a communication interface, a system including an electric motor and an evaluation unit may be created. Here, the communication interface would be configured to transmit sound sensor readings and/or processed readings from the sensor electronics to the evaluation unit. In this case, the evaluation unit is configured to evaluate the received readings and/or the received processed readings. The evaluation unit may be designed in various ways. The evaluation unit may be a dedicated unit and only designed for this application purpose. In some embodiments, however, the evaluation unit includes a laptop, a tablet, a smartphone, or other mobile terminal in which suitable software assumes the tasks of the evaluation unit. In this case, it is advisable that the communication interface be wireless.

In one application scenario, for example, the evaluation unit could include a smartphone with a corresponding app, which is able to access readings from the sound sensor by using Bluetooth LE as a communication interface. The app, here, could make the sensor electronics acquire readings of the sound sensor via the communication interface and transmit them to the evaluation unit in digital form via the communication interface. The app could then be used, for example, to perform a spectral analysis, compare the results with content in a database and output information about the condition of the bearing(s) to the user. Thus, an evaluation of the condition of the bearing(s) can easily be carried out during operation of the electric motor. Moreover, providing extensive memory and computing resources in the sensor electronics may no longer be needed.

We now have various ways, in which the teaching may be advantageously embodied and further developed. In this context, reference should be made to the following explanation of exemplary embodiments with reference to the drawing. Further to the explanation of exemplary embodiments with reference to the drawing will also be explained. In the drawings.

Figure 1:
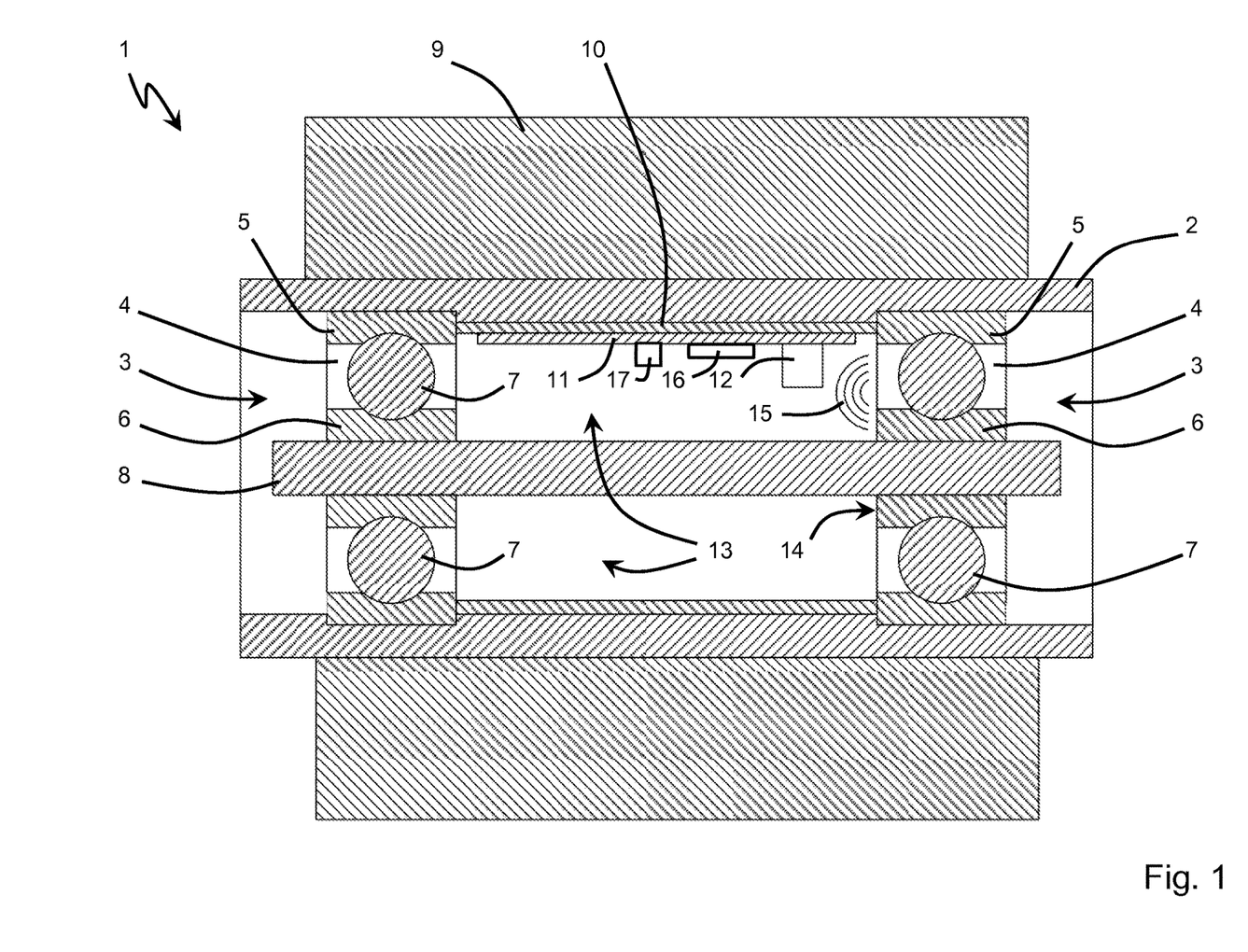
FIG. 1 shows a section through a bearing tube of an external rotor motor, in which a sound chamber is formed by the bearing tube.

FIG. 1 shows a section through a first exemplary embodiment of an electric motor, which is designed as an external rotor motor and in which the sound chamber is formed in a bearing tube. For the purpose of clarity, only a schematic representation is chosen, and selected elements of the electric motor are shown. For example, the rotor of the electric motor is not included in the drawing. The electric motor 1 includes a bearing tube 2, which is formed in a stator bushing of the electric motor. Bearing mounting areas 3 are formed at each of the two longitudinal ends, in each of which a bearing 4 is arranged. Each bearing 4 includes an outer ring 5 and an inner ring 6, wherein several rolling elements 7 are arranged between the outer ring 5 and the inner ring 6. A shaft 8 of the electric motor is received in the inner rings 6 of the bearings 4, and due to the bearings 4 is rotatable relative to a stator-winding assembly 9 arranged around the bearing tube. A support structure 10 is arranged between the bearings 5, 6, and which supports a circuit board 11. A sound sensor 12, which can detect sound waves, is arranged on the circuit board 11.

A sound chamber 13 is formed within the bearing tube 2, which is bounded by the inner walls of the bearing tube 2, the inner walls of the support structure 10, and the end faces 14 of the bearings 4. During operation of the bearings 4, which includes rotational movement of the shaft 8 relative to the stator winding assembly and thus rotational movement of the inner rings 6 relative to the outer rings 5, sound waves 15 are emitted by the bearings 4, which is outlined by a series of circular arcs in FIG. 1. In this regard, virtually all of the boundary surfaces of the sound chamber 13 may be acoustic surfaces. The end faces 14 of the bearings 4 will act primarily as acoustic surfaces and emit sound waves. However, the shaft 8 is vibrationally coupled to the bearings 4 via the inner rings 6, such that structure-borne sound generated during operation of the bearings is transmitted to the shaft 8, and thus also emitted to the sound chamber. The shaft 8 serves as a sound-conducting body, the surface of which emits sound in terms of an acoustic surface to the sound space. The same applies to the inner walls of bearing tube 2, which inner walls are vibrationally coupled to the outer rings 5 of the bearing 4 and thus can also transmit structure-borne sound from the bearing 4. Thus, the inner walls of the bearing tube 2 may also be acoustic surfaces. The support structure 10 can, on its material and design, a damping effect or transmit the sound from the inner walls of the bearing tube 2 to the sound chamber.

When the electric motor is operated, the sound waves 15 generated by the bearings 4 are emitted from the acoustic surfaces to the sound chamber. The sound sensor 12 may receive these sound waves reaching the sound sensor 12 via air and generate readings therefrom. In this case, the sound sensor 12 is arranged in the proximity of the end face 14 of one of the two bearings 4. readings obtained by the sound sensor 12 can be processed and/or evaluated by sensor electronics 16, which are shown symbolically. A communication interface 17, which is designed, for example, in the form of Bluetooth LE and is part of the sensor electronics, can be used to transmit readings to an evaluation unit (not shown) outside the electric motor.

Figure 2:
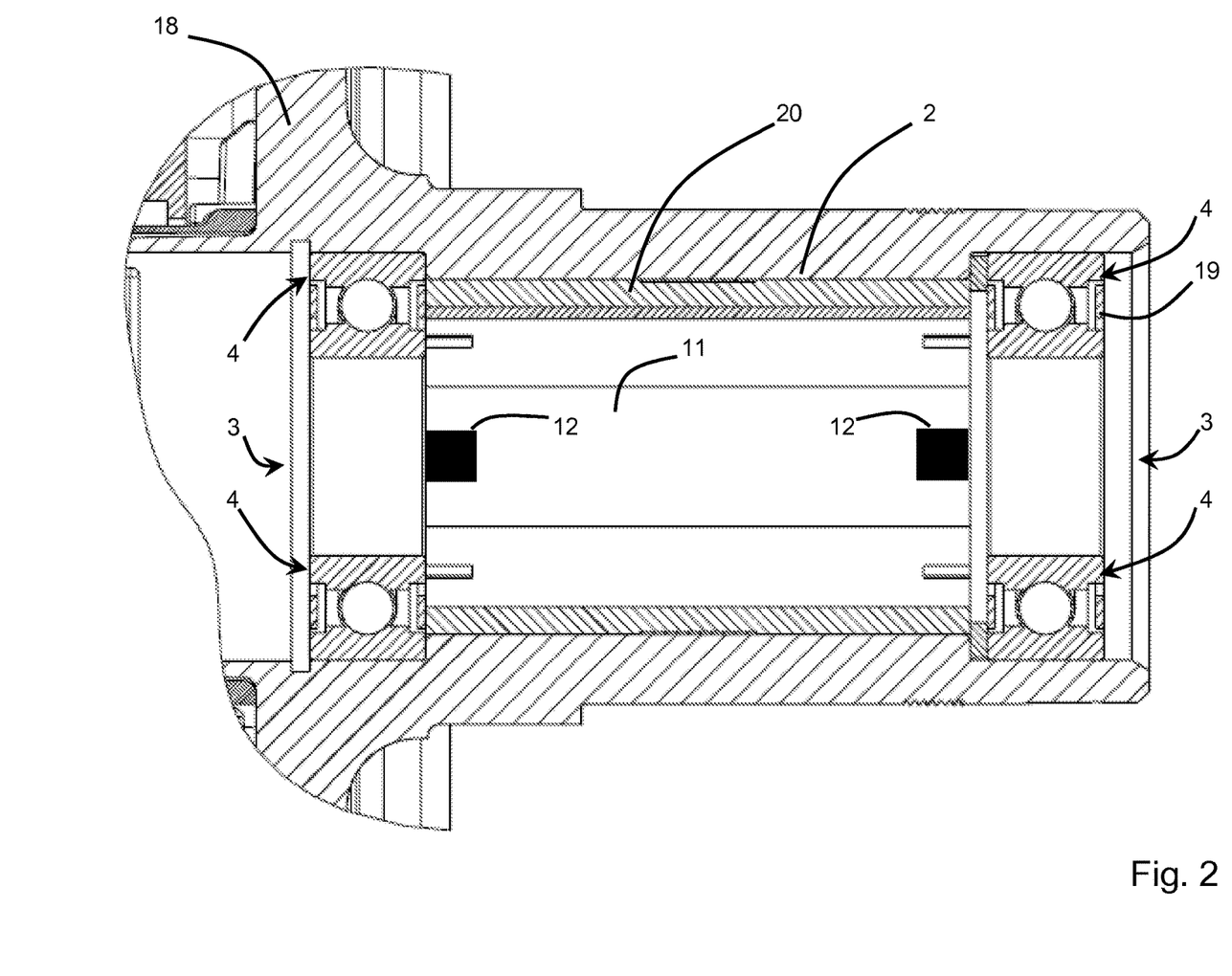
FIG. 2 shows a section through a bearing tube of another external rotor motor, in which a sound chamber is likewise formed by the bearing tube, and in which the sound sensor is part of a sensor arrangement inserted in the bearing tube.

FIG. 2 is a somewhat more detailed representation of a stator bushing 18 of a second exemplary embodiment of an electric motor. In the stator bushing 18, a bearing tube 2 is in turn formed, at the ends of which bearing mounting areas 3 are formed. In each of the bearing mounting areas 3, bearings 4 are arranged, which in turn have outer rings, inner rings and rolling elements. In addition, 4 rings 19 are arranged on the bearings, each closing the gap between the inner ring and the outer ring and counteracting a loss of bearing grease. A sensor arrangement is arranged in the bearing tube 2, as described in more detail in DE 10 2018 211 833 A1. A circuit board 11 is arranged on a carrier sleeve 20 of the sensor arrangement, as is a sound sensor 12 on each of the longitudinal ends thereof. Each sound sensor 12 is designed to detect sound from the respective adjacent bearing and generate measurement signals therefrom.

Figure 3:
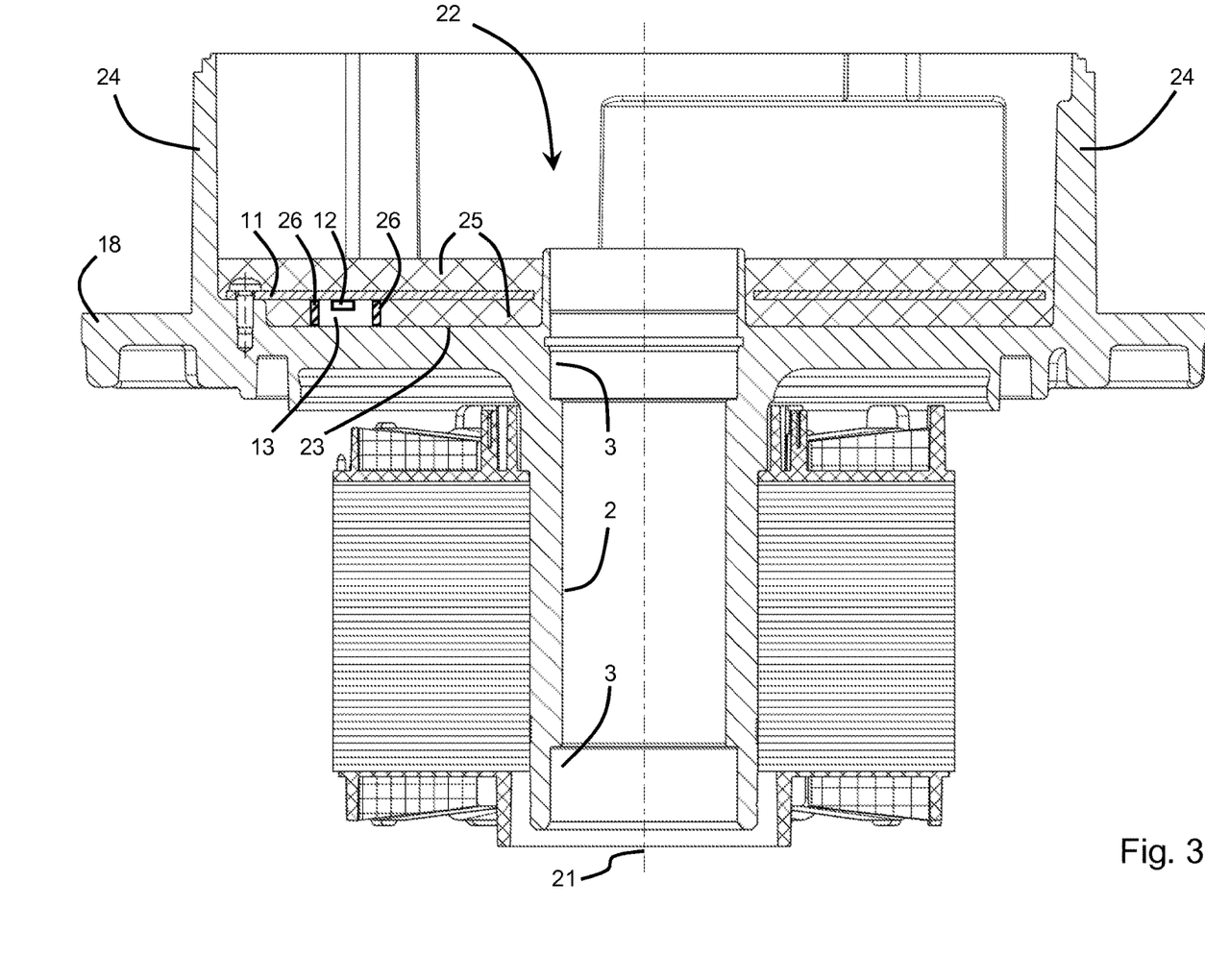
FIG. 3 shows a section through a stator bushing of an external rotor motor, in which the sound sensor is arranged on the motor electronics of the electric motor.

FIG. 3 shows a sectional view of further exemplary embodiment of an electric motor, in which a sound chamber is formed between a printed board and a stator bushing. A bearing tube 2 is formed on an engine axle 21, and a bearing mounting area 3 is formed on each longitudinal end of said bearing tube 2. Bearings, not shown, are received in the bearing mounting areas 3, via which a shaft of the electric motor, also not shown, is rotatably mounted. A stator bushing 18 is formed by an aluminum component, at one end of which the bearing tube 2 is formed and at the other end of which, an electronics housing 22 is formed for receiving motor electronics. The electronics housing 22 has a base 23 and side walls 24. The motor electronics generate feed signals and output them to the stator and/or rotor windings. For the purpose of clarity, only one circuit board 11, which is embedded in a potting compound 25, is shown for the engine electronics. A sound sensor 12 is also arranged on the circuit board 11 on the side of the circuit board facing the base 23. A limiting element 26 is arranged between the circuit board 11 and the base 23, leaving an area functioning as a sound chamber 13 in the potting compound 25.

Figure 4:
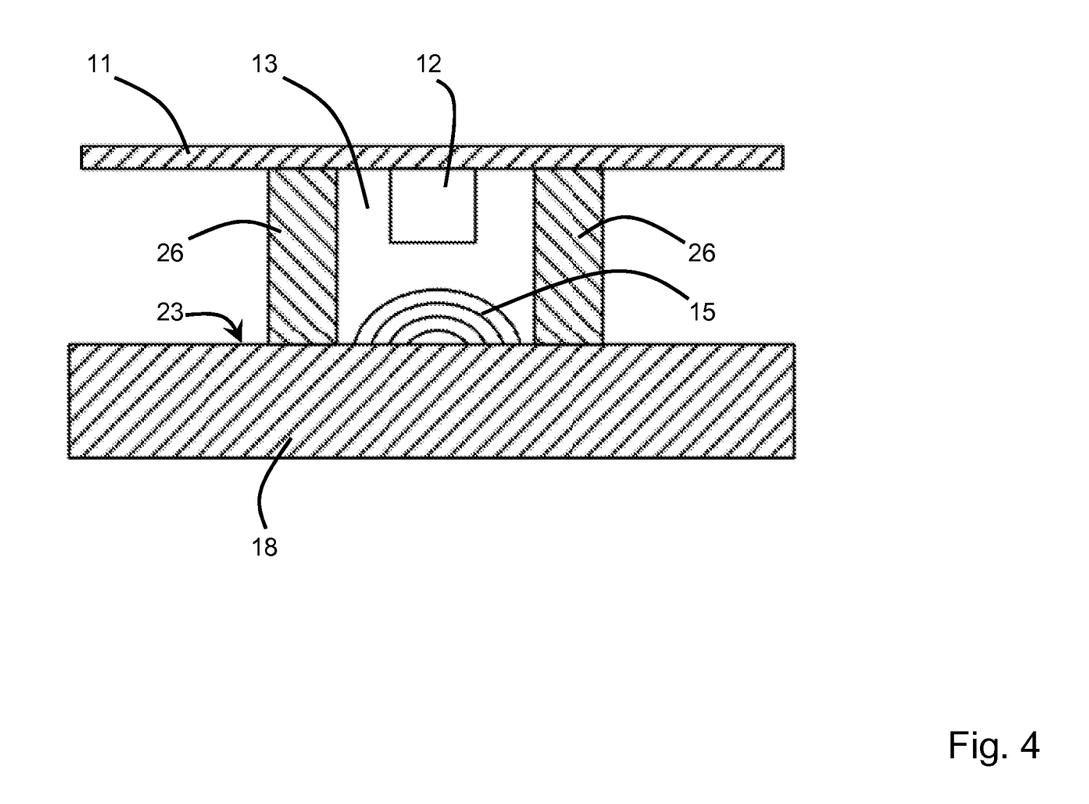
FIG. 4 shows an enlarged section of the sound chamber of the exemplary embodiment according to FIG. 3.

In FIG. 4, an enlarged section is shown again. circuit board 11, base 23 and limiting element 26 each delimit a sound chamber 13, in which a sound sensor 12 is arranged. The base 23, or the area of the base located between the limiting element 26, acts as an acoustic surface, which emits sound waves 15 into the sound chamber, which here is indicated by circular arcs. The stator bushing 18 transmits sound from the bearings to the surface of the stator bushing, i.e., in the case discussed here, base 23. This sound emitted into the sound chamber is detectable by sound sensor 12.

With regard to further advantageous embodiments of the electric motor, reference is made to the general part of the description and to the appended claims in order to avoid repetition.

Finally, it should be emphasized that the above-described embodiments are merely for the purpose of discussing the claimed teaching, i.e., they do not limit them to the exemplary embodiments.

LIST OF REFERENCE NUMERALS

1 Electric motor
2 Bearing tube
3 Bearing mounting areas
4 Bearing
5 Outer ring
6 Inner ring
7 Rolling element
8 Shaft
9 Stator winding assembly
10 Support structure
11 Circuit board
12 Sound sensor
13 Sound chamber
14 Front
15 Sound waves
16 Sensor electronics
17 Communication interface
18 Stator bushing
19 Rings
20 Carrier sleeve
21 Motor axle
22 Electronics housing
23 Base
24 Lateral walls
25 Potting compound
26 Limiting element

The invention claimed is:

1. An electric motor comprising:
at least one bearing;
an axle or shaft rotatably mounted to the least one bearing;
a sound chamber located within the electric motor and delimited by a plurality of boundary surfaces;
a circuit board disposed within the electric motor and having motor electronics, wherein the circuit board forms one of the plurality of boundary surfaces and wherein the sound chamber is disposed between the circuit board and a stator bushing of the electric motor;
a sound sensor located on the circuit board within the sound chamber, wherein sound is generated during operation of the electric motor, the sound being detectable by the sound sensor, wherein at least one boundary surface comprises an acoustic surface, the acoustic surface comprising a surface of the at least one bearing or a surface of a body conducting sound to the at least one boundary surface, the sound sensor being configured to detect sound transmitted through air from the acoustic surface to the sound sensor.

2. The electric motor of claim 1, wherein the sound generated during operation of the electric motor includes sound emitted by the at least one bearing.

3. The electric motor of claim 1, further comprising a limiting element located between the circuit board and the stator bushing, wherein the limiting element delimits the sound chamber in directions parallel to the circuit board.

4. The electric motor of claim 1, wherein the sound sensor is locating on the circuit board facing the stator bushing.

5. The electric motor of claim 1, wherein the body conducting sound is formed by the stator bushing of the electric motor, and the acoustic surface is formed by a surface of the stator bushing.

6. The electric motor of claim 1, wherein the sound chamber is formed by a bearing tube that encloses at least a portion of the axle or shaft, and whereon at least one bearing-receiving area for the at least one bearing is formed.

7. The electric motor of claim 6, wherein the sound sensor is part of a sensor arrangement configured to be inserted into the bearing tube.

8. The electric motor of claim 1, wherein the sound sensor is located on the acoustic surface.

9. The electric motor of claim 1, wherein the sound sensor is formed by a micro-electro-mechanical system.

10. The electric motor of claim 1, further comprising sensor electronics configured to drive the sound sensor.

11. The electric motor of claim 10, wherein the sensor electronics comprise a processor configured to processing and evaluate readings of the sound sensor.

12. The electric motor of claim 10, wherein the sensor electronics comprise memory for storing at least one of:
   readings of the sound sensor;
   processed readings; and
   results of an evaluation of the readings of the sound sensor.

13. The electric motor of claim 10, wherein the sensor electronics comprise a communication interface configured to transmit at least one of:
   readings of the sound sensor;
   processed readings; and
   results of an evaluation of the readings of the sound sensor.

14. A fan comprising:
   an impeller; and
   the electric motor of claim 1, the electric motor comprising a rotor, wherein the impeller is connected to the rotor.

15. A system comprising the electric motor of claim 1 and an evaluation unit, the electric motor comprising a sound sensor and sensor electronics, the evaluation unit comprising a communication interface, the communication interface configured to receive at least one of readings of the sound sensor and processed sound readings from the sensor electronics, wherein the evaluation unit is configured to evaluate at least one of the readings and the processed readings.

\* \* \* \* \*